United States Patent [19]

Reichert et al.

[11] Patent Number: 5,349,011

[45] Date of Patent: Sep. 20, 1994

[54] POLYAMIDE ESTER RHEOLOGICAL ADDITIVE, A SOLUTION CONTAINING THE ADDITIVE AND THICKENED COMPOSITIONS CONTAINING THE ADDITIVE

[75] Inventors: William W. Reichert, Freehold; Murray C. Cooperman, Woodbridge, both of N.J.

[73] Assignee: Rheox, Inc., Hightstown, N.J.

[21] Appl. No.: 99,400

[22] Filed: Jul. 30, 1993

Related U.S. Application Data

[63] Continuation of Ser. No. 745,716, Aug. 16, 1991, abandoned.

[51] Int. Cl.$^5$ .............................................. C08G 63/02
[52] U.S. Cl. ...................................... 524/602; 524/606; 528/272; 528/295.3
[58] Field of Search ............................ 524/602, 606; 528/295.3, 272

[56] References Cited

U.S. PATENT DOCUMENTS

| | | | |
|---|---|---|---|
| 2,410,788 | 4/1944 | Morgan | 260/22 |
| 3,131,201 | 4/1964 | Hovey | 260/404.5 |
| 4,026,850 | 5/1977 | Frank et al. | 260/22 TN |
| 4,304,900 | 12/1981 | Oneil et al. | 528/290 |
| 4,304,901 | 12/1981 | Oneil et al. | 528/290 |
| 4,462,926 | 7/1984 | Prator et al. | 252/315.1 |
| 4,778,843 | 10/1988 | Cooperman | 524/606 |
| 4,962,150 | 10/1990 | Allen | 524/602 |

FOREIGN PATENT DOCUMENTS

| | | |
|---|---|---|
| 1252282 | 11/1971 | United Kingdom . |
| 2177411 | 1/1987 | United Kingdom . |
| 2177412 | 1/1987 | United Kingdom . |

*Primary Examiner*—Edward Cain
*Attorney, Agent, or Firm*—Michael J. Cronin

[57] ABSTRACT

A polyamide (or oligomeric amide) ester rheological additive especially for organic solvent-based compositions comprises the reaction product of a defined polycarboxylic acid, a diamine, an alkoxylated polyol and a capping agent. The additive exhibits excellent efficiency and ease of dispersibility and is especially effective when first predispersed in an organic solvent. Organic solvent-based compositions which may be thickened by using the rheological additive are aliphatic, aromatic, and some moderately polar solvent-based compositions.

14 Claims, No Drawings

POLYAMIDE ESTER RHEOLOGICAL ADDITIVE, A SOLUTION CONTAINING THE ADDITIVE AND THICKENED COMPOSITIONS CONTAINING THE ADDITIVE

This is a continuation of application Ser. No. 07/745,71 6, filed Aug. 16, 1991, now abandoned.

The present invention relates to a polyamide ester or oligomeric amide ester rheological additive, a solution containing the additive and also a thickened composition containing the additive.

The rheological additive art has constantly sought materials which may be used to control the rheological properties of various compositions. For example, thickeners and other thixotropic agents are used for improving the spreadability of a coating on a surface during application, for preventing coatings which are applied to vertical surfaces from sagging, and for inhibiting pigments and other heavy fillers from separating or settling during storage of the coating composition. One type of material which has been shown to be useful to thicken various organic compositions is an organomodified clay.

Different kinds of organically modified (otherwise known as organophilic) clays are described in U.S. Pat. Nos. 4,081,496; 4,105,578; 4,116,866; 4,193,806; 4,208,218; 4,216,135; 4,287,086; 4,391,637; 4,410,364; 4,412,018; 4,434,075; 4,434,076; 4,450,095 and 4,517,112. Additional types of thickeners and thixotroprising agents which have been used in the past for organic coating compositions may include finely powdered or fumed silica or organic compositions such as castor wax products, modified unsaturated polyesters, polymeric amides, polyurethanes and polyester amides as disclosed, for example, in U.S. Pat. No. 4,462,926.

Certain types of polyamides have also been employed as rheological additives. A polyamide thixotropic agent is referred to in U.S. Pat. No. 3,131,201 which describes a resinous composition which is the reaction product of an alkyl diamine having from 2 to 6 carbon atoms and two terminal primary amines with a copolymer formed by the reaction of a glyceride of a polyunsaturated fatty acid having an iodine value above 130 and a conjugated alicyclic diene hydrocarbon monomer.

Thixotropic agents comprising polyamides which are also useful for thickening paint compositions which contain the thixotropic agents, and a process for incorporating the thixotropic agents in the form of a concentrated solution into a paint or a hardener or both are described in British Patent Nos. 2,177,411A and 2,177,412A. The thixotropic agents are produced by the reaction of (i) xylylene diamine or $C_4$–$C_8$ diamine, and (ii) hydroxy-substituted $C_1$–$C_{11}$ carboxylic acid (or the equivalent lactone), and (iii) polymer fatty acids. The molar ratio of (ii) to (i) is from 1:1 to 2:3 and the ratio of amine groups in (i) to acid groups in (ii) +(iii) is about 1:1.

A polyamide rheological additive especially for organic solvent-based compositions which comprises the reaction product of a defined polycarboxylic acid, an active hydrogen compound and a capping agent described as a monocarboxylic acid having olefinic unsaturation or hydroxyl group and containing 16–22 carbon atoms is disclosed in U.S. Pat. No. 4,778,843. The additive exhibits excellent efficiency and dispersability and is effective when first predispersed in an organic solvent. Organic solvent-based compositions which may be thickened using the rheological additive are aromatic, aliphatic and some moderately polar solvent-based compositions.

Certain types of polyamide esters have also been used as rheological additives. Thus, for example, previously mentioned U.S. Pat. No. 4,462,926 discloses a thixotropic agent for unsaturated polyester resins consisting of at least one cyclohexylamide of a saturated fatty acid which contains at least 10 carbon atoms and one or more oligomeric ester amides which have an average molecular weight of from 600 to 3,000, a content of carboxylic acid amide groups of from 1.5 to 15% by weight and a content of carboxylate groups of from 2 to 13% by weight.

U.S. Pat. No. 4,026,850 discloses thixotropic urethane alkyd resins in which fatty acid modified dimeric fatty acid polyester amides have been incorporated, obtainable by reacting mixtures of:

(a) OH-containing partial esters of polyhydric alcohols and long chain unsaturated fatty acids and/or OH-containing oligoesters of polyhydric alcohols, long chain unsaturated fatty acids and polybasic carboxylic acids;

(b) OH-containing fatty acid modified dimeric fatty acid polyester amides; with (c) diisocyanates.

It is, however, necessary to have unreacted hydroxyl groups reacted with the NCO-containing crosslinker to form resinous material. The fatty acid modified polyester amides which contain OH-groups are obtained by reacting mixtures of dimeric fatty acid polyamides, fatty acid partial esters and/or mixtures of fatty acid esters with polyhydric alcohols.

British Patent No. 1,252,282 discloses polyester resins suitable for use in flexographic and gravure ink vehicles and in the formulation of thixotropic vehicle compositions. It was found that if a portion of a polyfunctional amine is replaced by certain dihydric alcohols, the product does not gel certain aliphatic alcohols which are used as carrier solvents. In particular, polyesteramide material which comprises the condensation product of a polyamine, an ethoxylated diphenylolpropane, and a polymeric fatty acid is disclosed. The polyesteramide thixotrope is formed by the reaction of (a) diamine, (b) a particular dihydric alcohol where diphenylpropane is ethoxylated/propoxylated with 2 to 4 moles of ethylene oxide and/or propylene oxide. Capping agents in the form of a monofunctional carboxylic acid are not required; it is contemplated that a monobasic carboxylic acid which functions as a chain terminator can be used optionally.

European Patent Application No. 302,690 discloses a polyoxyalkylene polyamide thickener consisting of the reaction products of a diamine, an aminopropyl polyoxyethylene ether and a dimer acid. British Patent Application No. 2,188,330 discloses compositions which contain a polyether-amide derived from an aliphatic diamine, an ether mono-, di-, or triamine and optionally another monoamine and a dicarboxylic acid, optionally together with a monocarboxylic acid. The polyether-amides may be used to impart thixotropy to, or thicken, a wide variety of organic liquids and solvents, especially coating compositions. European Patent Application No. 239,419 discloses thixotropic compositions which comprise a film forming resin and a polyether-amide derived from an aliphatic diamine, an ether mono-, bi-, or triamine and optionally a different monoamine, and an organic dicarboxylic acid, optionally together with a monocarboxylic acid. A wide variety of organic liquid materials may be thickened by the polyetheramides, including thermoplastic and thermosetting acrylic polymers, by simple dissolution without heating.

U.S. Pat. No. 2,410,788 describes fatty amide polymers which are suitable for modifying the properties of textile fibers and not as a rheological additive. The disclosed polymers are resinous or semi-resinous materials of very large molecular weights in which dialcohol substituted carboamido compounds carrying side chains containing polyamino acid amide radicals are linked together by reaction with polybasic acids.

Despite the numerous types of known rheological additives, an ongoing search has been made for new rheological additives which are highly efficient and are readily dispersible in the composition to be thickened. The earlier organic thixotropic agents were based on castor wax products which have restrictions on processing temperatures when being incorporated into organic based compositions, in particular aliphatic, aromatic and some moderately polar solvent-based paint compositions. Tight processing temperature ranges are required for these additives between minimum and maximum limits for acceptable performance. Too low a processing temperature leads to an incomplete rheological development. Excessively high processing or storage temperatures may partially solubilize the organic rheological additives thereby leading to a loss of rheological structure and the formation of soft gel particles or "seeds" upon cool down. The polyamide thixotropic agents described in U.S. Pat. No. 4,778,843 have a minimum processing temperature with no upper processing temperature limit. For a proper development of rheology, a minimum temperature should be reached; however, because there is not an upper processing temperature limit, organic-based compositions and paints containing these additives do not "seed" or lead to the formation of soft gel particles on cool down. The main drawback with the use of these polyamide thickeners is that the minimum activation temperatures required for incorporation in an aliphatic paint system are quite high at 160°–180° F. compared to normal paint preparation processing temperatures of 120°–150° F.

It is accordingly an object of the present invention to provide an improved rheological additive for organic compositions which reduces minimum activation temperatures required for incorporation of a polyamide thixotrope in an aliphatic paint system by the inclusion of an alkoxylated moiety that contains at least two active hydrogen moieties in a polyamide composition which results in a polyamide ester composition.

It is a more specific object of the present invention to provide a polyamide ester rheological additive which is efficient in thickening organic compositions.

It is a further object of the present invention to provide a polyamide ester rheological additive that can be readily dispersed in the organic composition to be thickened.

It is a further object of the present invention to provide a polyamide ester rheological additive that can be readily dispersed in the organic composition to be thickened at low activation temperatures.

It is a further object of the present invention to provide a solution of the polyamide ester rheological additive in an organic solvent, which solution enhances a further improvement in efficiency.

It is a still further object of the present invention to provide an organic solvent solution of a polyamide ester rheological additive which exhibits improved efficiency and remains fluid in storage at ambient temperatures.

It is a still further object of the present invention to provide an organic solvent solution of a polyamide ester rheological additive which is easy to handle and which can readily be incorporated into organic compositions.

It is a yet further object of this invention to provide an efficient rheological additive for organic solvent-based systems which, once dispersed in the system, will remain so, and thus will not form "seeds" (large agglomerates) due to storage of the organic solvent-based system.

The present invention provides a rheological additive which comprises the reaction product of:
a) polycarboxylic acid having at least 5 carbon atoms per carboxylic acid group;
b) active hydrogen compound having the formula $X_m$—R—$Y_n$ wherein R represents a group containing from 2 to 12 carbon atoms, X and Y are independently selected from primary amino, secondary amino and hydroxyl and m and n are at least 1 and the sum of (m+n) is at least 2;
c) an alkoxylated active hydrogen compound which contains at least two active hydrogen functionalities, and more specifically an alkoxylated polyol which contains polyether segments, and
d) a capping agent wherein the capping agent is present in an amount sufficient to cap the reaction product of the polycarboxylic acid and the active hydrogen compound.

The present invention also provides a solution formed by dissolving the polyamide ester rheological additive in an organic solvent and a thickened organic composition containing the polyamide ester rheological additive.

Further advantages and features of the invention, as well as the scope, nature and utilization of the invention will become apparent to those skilled in the art from the description of the preferred embodiments of the invention set forth below.

DESCRIPTION OF THE PREFERRED EMBODIMENTS

As stated hereinabove, one aspect of the present invention relates to a polyamide ester rheological additive comprising the reaction product of polycarboxylic acid, active hydrogen compound, alkoxylated active hydrogen compound, and a capping agent. The polycarboxylic acid has at least 5 carbon atoms, preferably from 6 to 36 carbon atoms and most preferably from 16 to 20 carbon atoms per carboxylic acid group. While polycarboxylic acids having more than 2 carboxylic acid groups may be employed, the amount of such acids should be limited to avoid extensive cross linking Which would render the reaction product insoluble in the intended organic composition. This typically means that less than about 80 percent by weight, preferably less than 20 percent by weight, and most preferably less than 5 percent by weight of the total amount of polycarboxylic acid should have three or more carboxylic acid groups.

Illustrative polycarboxylic acids include sebacic acid, poly(butadiene)dioic acids, dodecane dicarboxylic acid and mixtures thereof. Especially preferred polycarboxylic acids are oligomers of fatty acids having a carbon chain of from 16 to 22 carbon atoms, preferably 16 to 18 carbon atoms. Exemplary fatty acids are those derived from soybean oil, castor oil, tall oil, corn oil, cottonseed oil, kapok seed oil, linseed oil and mixtures thereof. Even further preferred are oligomers of fatty acids which are substantially comprised of the dimerized fatty acid. Typically, the dimerized fatty acid constitutes at least about 20% by weight of the oligomerized fatty acid, preferably at least about 80% by weight of the oligomerized fatty acid. The oligomerized fatty acid preferably also has a low monomer content such as less than about 10% by weight and more preferably less than about 4% by weight.

Preparation of the oligomerized fatty acid, including the described low monomer content oligomer, is well known in the art and is disclosed, for example, in U.S. Pat. Nos. 2,793,219 and 2,955,121, the contents of which are incorporated by reference. Additionally, suitable oligomerized fatty acids are commercially available such as certain oligomerized fatty acids available under the name "Empol" from Emery Industries, a division of National Distillers & Chemical Corporation and "Sylvadym" available from Arizona Chemical Company.

The active hydrogen compound has the general formula $X_m$—R—$Y_n$ wherein R represents a group containing from 2 to 12 carbon atoms and which may contain non-reactive groups, such as ether, alkoxy or halogen groups, X and Y are independently selected from primary amino, secondary amino and hydroxyl and m and n are at least 1, the sum of (m+n) is at least 2, and preferably m and n are each 1. Preferably at least 50%, and more preferably at least 75%, and most preferably all of the X and Y groups participating in the reaction are primary amino, secondary amino or a mixture thereof. Preferably, R represents a group containing from 6 to 12 carbon atoms, and more preferably R represents a group containing from 6 to 8 carbon atoms, although R can represent a group containing from 2 to 12 carbon atoms which may contain an alkoxy non-reactive group.

As stated above with respect to the polycarboxylic acid, and as is apparent from the general formula, the active hydrogen compound can have 3 or more active groups. However, the amount of active hydrogen compound having 3 or more active groups should not be selected such that the reaction produce is cross-linked to an extent such that it is insoluble in the environment of the organic composition in which it is to be used. Typically, this means that the amount of active hydrogen compound having 3 or more active hydrogen groups should be less than about 20 mole percent, preferably less than about 2 mole percent and most preferably it is substantially absent.

Illustrative active hydrogen compounds include polyamines, such as 1,2-diaminoethane, 1,2- and 1,3-diaminopropane, 1,4-diaminobutane, 1,6-diaminohexane, 1,8-diaminooctance, 1,12-diaminododecane, 3,3-diaminopropyl-N-methyl-amine, N-alkyl-1,3-diaminopropanes wherein the alykl group is a long carbon chain such as coco or tallow alkyl, soya alkyl, oleyl, stearyl and mixtures thereof, and amino alcohols, such as ethanolamine, 6-aminohexanol, aminoethylethanolamine and mixtures thereof.

Diols which may constitute a portion of the active hydrogen compound are exemplified by 1,2-ethanediol, 1,2- and 1,3-propane diol, 1,4-butane diol, 1,6-hexanediol, diethylene glycol, triethylene glycol and mixtures thereof.

Preferred active hydrogen compounds are diamines, especially diamines having from 6 to 12 carbon atoms with the most preferred diamine being 1,6-diaminohexane.

The alkoxylated active hydrogen compound is a polyether segment (alkoxylated) moiety with at least 2 active hydrogen groups. The alkoxylated active hydrogen compound has an active amine or hydroxyl moiety at each termini of the polyether chain and/or have an end of the polyether chain linked to a central molecular fragment having at least one additional amine or hydroxyl moiety and/or polyether chain attached thereon. This definition includes alkoxylated polyols (polyalkylene glycols or polyalkylene diols) that have two hydroxyl end groups and contain ethylene, propylene, or butylene oxide units such as polyethylene glycol, polypropylene glycol or polybutylene glycol, respectively, with molecular weights of about 250 to 2000. Additionally adducts of an alkylene oxide and a difunctional reactant such as an alkanolamine (e.g., ethanolamine) are also useful; such adducts are also known as diol ethers or alkanol amine ethers. Also, suitable compounds which provide polyether segments include amine-terminated polyoxyethylenes of the formula:

$H_2N(CH_2CH_2O)_xH$ and
$H_2N(CH_2CH_2O)_xCH_2CH_2NH_2$ where x ranges from about 10 to 50 and such compounds are commercially available under the tradename "Jeffamine." Also, the alkoxylated active hydrogen compound includes alkoxylated aliphatic nitrogen-containing compounds. The alkoxylated aliphatic nitrogen-containing compound can have a chemical structure represented by the formula:

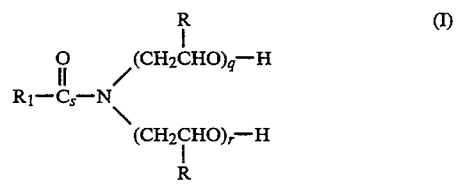

(I)

where $R_1$ is a straight or branched chain aliphatic alkyl group having 6 to 30 carbon atoms, R can be a hydrogen, methyl, or ethyl group, both q and r are at least 1, s is zero or 1, and the sum of q+r is from 2 to 50.

Illustrative alkoxylated aliphatic nitrogen-containing compounds represented by formula (I) include those tertiary amines having one fatty alkyl group derived from various fatty sources having 12 to 18 carbon atoms and at least two polyoxyethylene or polyoxypropylene groups attached to the nitrogen. Polyethoxylated aliphatic amine polyols are commercially available and marketed by Akzo Chemicals, Inc. under the tradename "Ethomeen" while polyethoxylated aliphatic amides are available from the same company under the tradename "Ethomid".

As stated above with respect to the polycarboxylic acid and active hydrogen compound, the alkoxylated active hydrogen compound can also have 3 or more active groups. However, the amount of alkoxylated active hydrogen compound having 3 or more active groups should not be selected such that the reaction product is crosslinked to an extent such that it is insoluble in the environment of the organic composition in which it is to be used. Typically, this means that the amount of active hydrogen compound having 3 or more active hydrogen groups should be less than about 10 mole percent, preferably less than about 2 mole percent and most preferably it is substantially absent. An example of an alkoxylated active hydrogen compound having 3 or more active groups can be represented by an alkoxylated aliphatic nitrogen-containing compound which has a chemical structure represented by the following formula:

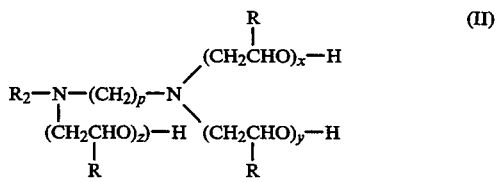

wherein $R_2$ is a straight or branched chain aliphatic alkyl group having 6 to 30 carbon atoms, the value of p can range from 1 to 20, and R has the same meaning used with respect to formula (I). The values of x, y and z are independently selected and can be zero or an integer greater than zero with the sum of $x+y+z$ being from 1 to 50.

Illustrative alkoxylated aliphatic amines represented by formula (II) include those amines obtained from N-alkyl trimethylene diamines and having two polyoxyethylene groups attached to one nitrogen group. Such polyalkoxylated aliphatic diamines are commercially available and marketed by Akzo Chemicals, Inc. under the tradename "Ethoduomeen".

Preferred alkoxylated hydrogen compounds are polyethylene oxide glycols with molecular weights ranging from 100–1000 and alkoxylated aliphatic nitrogen-containing compounds of the chemical structure represented by formula (I) wherein $R_1$ is 12 to 22 carbon atoms, R is hydrogen, $s=0$, and the sum of $q+r$ is 2 to 15. Most preferably, alkoxylated hydrogen compounds are alkoxylated nitrogen-containing compounds of the chemical structure represented by formula (I) wherein $R_1$ is a fatty alkyl having 12 to 18 carbon atoms, such as coco, soya, tallow, hydrogenated tallow, oleyl, octadecyl, and mixtures thereof, R is hydrogen, s is 0, and the sum of $q+r$ is 2 to 10.

The capping agent is used to terminate the reaction product of the polycarboxylic acid, the active hydrogen compound and the alkoxylated active hydrogen compound and is preferably a monocarboxylic acid which is at least one of unsaturated and hydroxylated. The monocarboxylic acid generally has from 8 to 22 carbon atoms. While monocarboxylic acids having fewer carbon atoms may be used to achieve certain benefits in environments such as organic solvent-based coatings, such smaller monocarboxylic acid should be preferably limited to less than 20 mole percent, more preferably less than 10 mole percent of the total capping agent employed and most preferably are absent.

It is more preferred to have a monocarboxylic acid capping agent containing both unsaturation and hydroxylation. Further preferred is a monocarboxylic acid capping agent with a single point of unsaturation (if aliphatic) or a single hydroxyl moiety. Most preferred is a monocarboxylic capping agent with a single point of unsaturation (if aliphatic) and a single hydroxyl moiety.

The capping agent may also have a straight or branched chain and may also contain groups, such as tertiary amino, alkoxy, halo, keto, etc., which do not react with the other components used to prepare the rheological additive.

Illustrative unsaturated aliphatic acids include linoleic acid, linolenic acid, oleic acid, monocarboxylic acids derived from dehydrated castor oil, undecylenic acid, tall oil fatty acids, soya fatty acids, and mixtures thereof. Aromatic acids, such as benzoic acid, salicylic acid and mixtures thereof may also be employed as a portion of the total capping agent.

Hydroxylated monocarboxylic acids include ricinoleic acid, 12-hydroxystearic acid, 12-hydroxydodecanoic acid, and mixtures thereof. The preferred capping agent is ricinoleic acid.

The capping agent may be composed of a compound which is not a monocarboxylic acid which is unsaturated and/or 5 hydroxylated. For example, the capping agent may be composed of at least one non-hydroxylated, saturated aliphatic monocarboxylic acid such as octanoic acid, nonanoic acid, dodecanoic acid, octadecanoic acid, docosanoic acid, hydrogenated tallow acids, stearic acid and mixtures thereof. Other examples of capping agents are monoisocyanates.

From the foregoing discussion, it can be understood that an especially preferred aspect of the present invention is a polyamide ester rheological additive which is the reaction product of oligomer of fatty acid having a carbon chain of from 16 to 18 carbon atoms, diamine having from 6 to 12 carbon atoms, an ethoxylated $C_{12}$–$C_{18}$ alkyl amine having 2 to 10 ethoxylated units, and unsaturated and hydroxylated monocarboxylic acid having from 8 to 22 carbon atoms as the capping agent, with the most preferred capping agent being ricinoleic acid. It can also be understood that while additional groups and/or components can be present, the presence of such material should not be present to substantially adversely affect the ability of the rheological additive to function in its intended environment and in this respect the reaction product consists essentially of the defined components.

Two presently preferred compositions are: Ricinoleic acid (2)/1,6-hexamethylene diamine (3)/C-36 dimer acid (3)/Ethoxylated [5] octadecylamine (1), and Ricinoleic acid (2)/1,6-hexamethylene diamine (3)/C-36 dimer acid (3)/polyethylene oxide glycol M.W. 400 (1), where the numbers in parenthesis are molar equivalents and the numbers in brackets are units of ethylene oxide.

Laboratory experiments have defined the following preferred compositional limits for the alkoxylated active hydrogen compound.

wherein
$n=4$–$50$, and

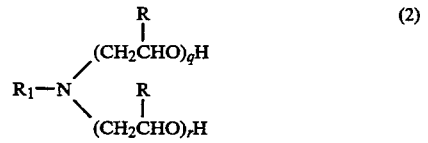

where $q+r=2$–$50$ and $R_1$ is a long chain alkyl group $C_{12}$–$C_{22}$ and R can be hydrogen, methyl or ethyl. Consequently, if the number of alkoxylated units is 2 to 4 (i.e., $\leq 4$), then the presence of a long chain ($C_{12}$–$C_2$) alkyl group is preferred.

The polyamide ester rheological additive is believed to function via a pigment-rheological additive interaction of an associative nature, The presence of the polar alkoxy moieties increases the pigment-rheological additive interaction in a coatings system, thereby increasing the ease of dispersion and lower the energy (i.e., temperature) requirements for rheological incorporation into the coatings system.

The specific types and amount of the reactants are selected so as to obtain a non-resinous reaction product which can be dispersed in the intended organic composition and which will function as a rheological additive. The amount of active hydrogen compound reacted to form the reaction product can be in the range of from about 0.25 to about 2.0, preferably from about 0.5 to about 2.0 and most preferably from about 0.75 to about 1.175 moles per mole of the reacted polycarboxylic acid.

The amount of alkoxylated active hydrogen compound reacted to form the reaction product can be in the range from about 0.10 to about 1.5, preferably from about 0.25 to about 0.75, and most preferably from about 0.25 to about 0.50 moles per mole of the reacted polycarboxylic acid.

The amount of capping agent selected is sufficient to cap the ends of the reaction product upon completion of the reaction. Typically, the amount of capping agent reacted to form the reaction product is in the range of from about 0.1 to about 4.0, preferably from about 0.17 to about 2.0 and most preferably from about 0.3 to about 2.0 moles per mole of the reacted polycarboxylic acid.

As should be apparent to those skilled in the art, the molar amounts of the components in the reaction mixture may be different than that of the formed polyamide ester rheological additive. That is, one or more of the reactants may be employed in excess. Typically, for instance, it has been found advantageous to use a 2–10% molar excess of the active hydrogen compound (e.g., diamine) which accelerates the reaction and makes up for that amount lost by co-distillation with the water of reaction. The average molecular weight of the reaction product, which can, for instance, be determined from gel fermation chromatography ranges from about 600 to about 15,000, preferably from about 1,400 to about 10,000 and most preferably from about 2,000 to about 5,000. It can therefore be understood from this discussion that the polyamide ester rheological additive is not a polymeric resin, but is instead a relatively low molecular weight compound.

The polyamide ester rheological additive may be prepared according to known techniques. For example, the reactants may be charged to a suitable reaction vessel which is equipped with a mechanical stirrer, a thermometer, a Dean-Stark trap equipped with a Bartlett modification and a nitrogen inlet. The vessel can be heated with stirring under a nitrogen blanket. After completion of the reaction, which can be determined by acid number (e.g., preferably less than about 25), the polyamide ester is cooled and is discharged. If amenable to grinding, which is dependent on the melting point of the particular polyamide ester rheological additive, the polamide ester can then be ground to a fine particle size.

The polyamide ester rheological additives of the present invention are a substantial improvement over known additives. In contrast to some particulate-type rheological additives, which are exemplified by organomodified clays and finely divided (fumed) silica, the polyamide ester rheological additives of the present invention can have excellent flow and leveling properties, as well as excellent efficiency and easy dispersing characteristics. Additionally, coating compositions containing the polyamide ester rheological additives of the present invention may be prepared such that large agglomerates (sometimes referred to as "seeds") which sometimes form during storage of coating compositions containing prior art thixotropes can be avoided. Furthermore, in addition to being "seed"-resistant, the polyamide ester rheological additive of the present invention can be incorporated at lower activation temperatures in aliphatic alkyd coating systems compared to recent polyamide rheological additives disclosed in the art.

The polyamide rheological additive of the present invention may be used to thicken a variety of organic solvent-based compositions and it is believed that the rheological additive can also be used in some solvent-free compositions. The additive is particularly useful, for example, in thickening aliphatic solvent-based compositions and, while not as efficient, may also be used in certain aromatic solvent-based and moderately polar (e.g., ketones and alcohols) based compositions. Illustrative organic solvent-based compositions include aliphatic alkyd paints such as Trade Sales solvent-based paints and varnishes, aromatic solvent-based paints based on acrylic, alkyd and polyester binders, such as standard quality industrial paints which include appliance enamels, equipment enamels, and automotive refinish enamels, and certain sealants.

It should also be understood that the amount of polyamide ester rheological additive used in a specific instance is determined by numerous factors including the reactants used in the preparation of the additive, the type of organic solvent-based composition to be thickened, and the level of thickening desired. However, a general range is from about 1.5 to about 30 pounds per hundred gallons of composition. On a weight basis, the amount of polyamide ester rheological additive is generally from about 0.1 to about 5% by weight, preferably from about 0.1 to about 3% by weight and most preferably from about 0.2 to about 1% by weight.

To further improve the efficiency and handling of the polyamide ester rheological additive in the organic composition and/or to effectively use those polyamide esters which may not be amenable to grinding, the polyamide esters can be first pre-dispersed in a compatible organic solvent, especially at a slightly elevated temperature. Preferably, the solvent contains at least about 50% by weight of an alcohol such as methanol, ethanol, 1-propanol, 2-propanol, 1-butanol, 2-butanol, isobutanol, isoamyl alcohol, cyclohexanol and mixtures thereof with the preferred alcohol being cyclohexanol.

The remaining portion of the solvent can be any organic solvent, which, with the alcohol, will provide a fluid solution of the polyamide rheological additive and which will be compatible with the intended application of the additive. Preferred cosolvents are aromatic solvents, such as benzene, toluene, xylenes, or ethyl benzene and mixtures thereof, and aliphatic solvents such as mineral spirits, mineral oil, hexanes, heptanes and mixtures thereof with the most preferred cosolvents being toluene and xylenes.

The preferred combination of solvents is cyclohexanol and Aromatic 150 (an aromatic solvent available from Exxon Chemical Company) in a weight ratio of from about 1:1 to about 9:1 and most preferably from about 1:1 to 2:1. Such a combination with the rheological additive provides a solution which remains fluid on storage at ambient temperatures and functions as an efficient rheological additive or thixotrope when used in an organic solvent based application.

The amount of polyamide ester rheological additive which can be pre-dispersed in the solvent understandably varies depending on several factors, but generally is in the range of from about 5 to about 75% by weight, preferably from about 20 to about 50% by weight.

The invention will be further clarified by the following examples which are intended to be purely exemplary of the invention and should not be construed as limiting the invention.

PREPARATION OF RHEOLOGICAL ADDITIVE

A one liter resin flask, equipped with a mechanical stirrer, a thermometer, a Dean-Stark trap-Bartlett modification and a nitrogen inlet is charged with (a) molten or liquid active hydrogen compound, (b) molten or liquid alkoxylated active hydrogen compound, (c) polycarboxylic acid, and (d) capping agent. The mixture is heated with stirring under a nitrogen blanket. Water begins to be evolved at approximately 150°–155° C. After two hours at 180°–195° C., aliquots are removed hourly and analyzed for acid number and the reaction is continued until the acid number reaches a minimum or falls below 25.

The reaction product is cooled to 140°–145° C. and is discharged into a stainless steel tray and allowed to cool overnight. If the solid form of the product is used for evaluation and is amenable to grinding, the product is cooled with liquid nitrogen and ground cryogenically to a fine powder using a Brinkmann centrifugal mill.

If a solution form of the solid product is desired, the rheological additive is then predispersed in an organic solvent by dissolving with slight heating (usually at 50° C.) in varying amounts in organic solvents.

EXAMPLE 1

$C_{36}$ Dimer Acid—1,6-hexamethylene diamine—Ethoxylated (5) octadecylamine capped with Ricinoleic Acid A mixture of 54.70 g (0.471 moles) of molten 1,6-hexamethylenediamine, 75.46 g (0.154 moles) of an ethoxylated [5] octadecylamine (Ethomeen 18/15, commercially available from Akzo Chemicals, Inc.), 271.74 g (0.463 moles) of a $C_{36}$ dimer acid with a molecular weight of 586.9 (Sylvadym T-18, commercially available from Arizona Chemicals), and 91.99 g (0,309 moles) of ricinoleic acid is added to a one liter resin flask equipped with a mechanical stirrer, a thermometer, a Dean-Stark trap-Bartlett modification, and a nitrogen inlet. The reaction mixture is heated with stirring under a nitrogen blanket. Water beings to be evolved at approximately 150°–155° C. After two hours at 190°–195° C., aliquots are removed hourly and analyzed for acid number and the reaction is continued until the acid number reaches a value of 14–15.

The reaction product is cooled to 140° C. and is discharged into a stainless steel tray and allowed to cool to room temperature overnight. The product is then cooled with liquid nitrogen, dried and ground cryogenically to a fine powder using a Brinkmann centrifugal mill.

EXAMPLE 2

$C_{36}$ Dimer Acid—1,6-Hexamethylene diamine—Polyethylene Glycol (PEG) Capped with Ricinoleic Acid A mixture of 62.71 g (0.540 moles) of molten 1,6-hexamethylene diamine, 70.78 g (0.176 moles) of a polyethylene glycol with an approximate molecular weight of 400 (PEG 400), 311.52 g (0.531 moles) of a $C_{36}$ dimer acid (Sylvadym T-18, commercially available from Arizona Chemicals), and 105.46 g (0.354 moles) of ricinoleic acid is added to a one liter resin flask equipped with a mechanical stirrer, a thermometer, a Dean-Stark trap-Bartlett modification and a nitrogen inlet. The reaction mixture is heated with stirring under a nitrogen blanket. Water begins to be evolved at approximately 150°–155° C. After two hours at 190°–195° C., aliquots are removed hourly and analyzed for acid number and the reaction is continued until the acid number reaches a value of 17.

The reaction product is cooled to 140° C. and is discharged into a stainless steel tray and allowed to cool to room temperature overnight. The product is then cooled with liquid nitrogen, dried and ground cryogenically to a fine powder using a Brinkmann centrifugal mill.

COMPARATIVE EXAMPLE A $C_{36}$ Dimer Acid—1,6-Hexamethylene Diamine—Capped with Ricinoleic Acid A mixture of 101.2 g (0,871 moles) of molten 1,6-hexamethylene diamine, 371.5 g (0,641 moles) of a $C_{36}$ dimer acid with a molecular weight of 580.0 (Sylvadym T-18 commercial available from Arizona Chemicals), and 127.3 g (0.427 moles) of ricinoleic acid is added to a one liter resin flask equipped with a mechanical stirrer, a thermometer, a Dean-Stark trap-Bartlett modification and a nitrogen inlet. The reaction mixture is heated with stirring under a nitrogen blanket. Water begins to be evolved at approximately 150°–155° C. After two hours at 190°–195° C., aliquots are removed hourly and analyzed for acid numbers and the reaction is continued until the acid number reaches a value of 4.

The reaction product is cooled to 140° C. and is discharged into a stainless steel tray and allowed to cool to room temperature overnight. The product is then cooled with liquid nitrogen, dried and ground cryogenically to a fine powder using a Brinkmann centrifugal mill.

RHEOLOGICAL ADDITIVE REACTANTS AND CHARACTERISTICS

Various reactants were used to prepare the rheological additives in Examples 3–19 in Table I below in accordance with the procedure set forth above. The reactants, the molar amounts thereof, the acid value as determined by titration, and the melting point are set forth below in Table I.

TABLE I

| Example No. | Additive Reactants | Molar Ratio Amounts | Acid Value | Melting Point (°C.) |
|---|---|---|---|---|
| 1 | Ricinoleic Acid | 2 | 14.6 | 69–74 |
|  | Sylvadym T-18 | 3 |  |  |
|  | 1,6-hexamethylene diamine | 3.05 |  |  |
|  | Ethomeen 18/15 | 1 |  |  |

TABLE I-continued

| Example No. | Additive Reactants | Molar Ratio Amounts | Acid Value | Melting Point (°C.) |
|---|---|---|---|---|
| 2 | Ricinoleic Acid | 2 | 16.9 | 69–73 |
|  | Sylvadym T-18 | 3 | | |
|  | 1,6-hexamethylene diamine | 3.05 | | |
|  | PEG 400 | 1 | | |
| Comp A | Ricinoleic Acid | 2 | 2.6 | 76–83 |
|  | Sylvadym T-18 | 3 | | |
|  | 1,6-hexamethylene diamine | 4.08 | | |
| 3 | Ricinoleic Acid | 2 | 14.8 | 74–81 |
|  | Sylvadym T-18 | 3 | | |
|  | 1,6-hexamethylene diamine | 3.05 | | |
|  | Ethomeen C/15 | 1 | | |
| 4 | Ricinoleic Acid | 2 | 7.5 | 65–68 |
|  | Sylvadym T-18 | 3 | | |
|  | 1,6-hexamethylene diamine | 3.05 | | |
|  | Ethomeen 18/12 | 1 | | |
| 5 | Ricinoleic Acid | 2 | 12.1 | 72–74 |
|  | Sylvadym T-18 | 3 | | |
|  | 1,6-hexamethylene diamine | 3.05 | | |
|  | Varonic U205 | 1 | | |
| 6 | 12-Hydroxystearic Acid | 2 | 15.2 | 85–88 |
|  | Sylvadym T-18 | 3 | | |
|  | 1,6-hexamethylene diamine | 3 | | |
|  | Ethomeen 18/15 | 1 | | |
| 7 | Stearic Acid | 2 | 14.7 | 93–97 |
|  | Sylvadym T-18 | 3 | | |
|  | 1,6-hexamethylene diamine | 3 | | |
|  | Ethomeen 18/15 | 1 | | |
| 8 | Oleic Acid | 2 | 15.3 | 80–83 |
|  | Sylvadym T-18 | 3 | | |
|  | 1,6-hexamethylene diamine | 3 | | |
|  | Ethomeen 18/15 | 1 | | |
| 9 | Undecylenic Acid | 2 | 17.5 | 88–91 |
|  | Sylvadym T-18 | 3 | | |
|  | 1,6-hexamethylene diamine | 3 | | |
|  | Ethomeen 18/15 | 1 | | |
| 10 | Lauric Acid | 2 | 18.6 | 88–93 |
|  | Sylvadym T-18 | 3 | | |
|  | 1,6-hexamethylene diamine | 3 | | |
|  | Ethomeen 18/15 | 1 | | |
| 11 | Linoleic Acid | 2 | 13.8 | 83–85 |
|  | Sylvadym T-18 | 3 | | |
|  | 1,6-hexamethylene diamine | 3 | | |
|  | Ethomeen 18/15 | 1 | | |
| 12 | Ricinoleic Acid | 2 | 17.5 | 65–67 |
|  | Sylvadym T-18 | 4 | | |
|  | 1,6-hexamethylene diamine | 3.05 | | |
|  | Ethomeen 18/15 | 2 | | |
| 13 | Ricinoleic Acid | 2 | 24.5 | 58–61 |
|  | Sylvadym T-18 | 3 | | |
|  | 1,6-hexamethylene diamine | 2.10 | | |
|  | Ethomeen 18/15 | 2 | | |
| 14 | Ricinoleic Acid | 2 | 22.8 | 58–61 |
|  | Sylvadym T-18 | 3 | | |
|  | 1,6-hexamethylene diamine | 2 | | |
|  | Ethomeen 18/20 | 2.1 | | |
| 15 | Ricinoleic Acid | 2 | 21.3 | 54–61 |
|  | Sylvadym T-18 | 3 | | |
|  | 1,6-hexamethylene diamine | 2.1 | | |
|  | Ethomeen C/15 | 2 | | |
| 16 | Ricinoleic Acid | 2 | 10.9 | 74–81 |
|  | Sylvadym T-18 | 4 | | |
|  | 1,6-hexamethylene diamine | 3.05 | | |
|  | Ethomeen C/15 | 2 | | |
| 17 | Ricinoleic Acid | 2 | * | * |
|  | Sylvadym T-18 | 3 | | |
|  | 1,6-hexamethylene diamine | 3.05 | | |
|  | PEG 1500 | 1 | | |
| 18 | Ricinoleic Acid | 2 | | |
|  | Sylvadym T-18 | 3 | | |
|  | 1,6-hexamethylene diamine | 3 | | |
|  | PPG 710 | | | |
| 19 | Ricinoleic Acid | 2 | * | * |
|  | Sylvadym T-18 | 3 | | |
|  | 1,6-hexamethylene diamine | 3.05 | | |
|  | PPG 1000 | 1 | | |

*Not determined.

Table I:
(a) Sylvadym T-18 is dimerized fatty acid available from Arizona Chemicals and contains 82% dibasic acid, 18% polybasic acids, and <1% monobasic acid.
(b) Ethomeen 18/15 is a polyoxyethylene (5) octadecylamine available from Akzo Chemicals, Inc.
(c) Ethomeen C/15 is a polyoxyethylene (5) cocoamine available from Akzo Chemicals, Inc.
(d) Ethomeen 18/12 is a bis(2-hydroxyethyl)octoadecylamine available from Akzo Chemicals, Inc.
(e) Varonic U205 is a PEG 5 cetyl/stearylamine available from Sherex Chemical Company, Inc.

PREPARATION OF PREDISPERSED RHEOLOGICAL ADDITIVE IN ORGANIC SOLVENT

To evaluate the solution form of the solid rheological additive predispersed in organic solvent, samples of the additive which were prepared in the manner previously described were dissolved in varying amounts in organic solvents. The rheological additives and solvent solutions are set forth in Table II.

TABLE II

| Example No. | Solid Rheological Additive (Ex. No.) | Solvent and Weight % of Rheological Additive |
|---|---|---|
| 20 | 1 | 41.8% in cyclohexanol |
| 21 | 2 | 39.8% is cyclohexanol |
| Comp. B | Comp. A | 30.0% in cyclohexanol: Aromatic 150 (1:1 weight ratio of solvent) |
| 22 | 3 | 40.8% in cyclohexanol |
| 23 | 4 | 40.2% in cyclohexanol |
| 24 | 5 | 30.0% in cyclohexanol: Aromatic 150 (1:1 weight rato of solvent) |
| 25 | 6 | 30.2% in cyclohexanol: Aromatic 150 (1:1 weight ratio of solvent) |
| 26 | 7 | 30.2% in cyclohexanol: Aromatic 150 (1:1 weight ratio of solvent) |
| 27 | 8 | 29.9% in cyclohexanol: Aromatic 150 (1:1 weight ratio of solvent) |
| 28 | 9 | 29.9% in cyclohexanol: Aromatic 150 (1:1 weight ratio of solvent) |
| 29 | 10 | 29.9% in cyclohexanol: Aromatic 150 (1:1 weight ratio of solvent) |
| 30 | 11 | 30.4% in cyclohexanol: Aromatic 150 (1:1 weight ratio of solvent) |
| 31 | 12 | 40.0% in cyclohexanol |
| 32 | 13 | 39.2% in cyclohexanol |
| 33 | 14 | 39.9% in cyclohexanol |
| 34 | 15 | 40.0% in cyclohexanol |
| 35 | 16 | 40.1% in cyclohexanol |
| 36 | 17 | 40.0% in cyclohexanol |
| 37 | 18 | 41.9% in cyclohexanol |
| 38 | 19 | 38.2% in cyclohexanol |
| 39 | 3 | 35.0% in cyclohexanol: Aromatic 150 (1:1 weight ratio of solvent) |

EVALUATION OF RHEOLOGICAL ADDITIVES

A number of the previously described samples were incorporated into a standard aliphatic alkyd gloss enamel at a loading of 3 pounds on the basis of solids per hundred gallons and a number of tests conducted to demonstrate the ease of dispersion and effectiveness of the rheological additive.

The aliphatic alkyd gloss enamel paint was prepared by mixing the ingredients set forth in Formulation A in the order listed. The ingredients were mixed using a one horsepower Premier high speed dispersator equipped with a 1⅜ diameter Cowles sawtooth blade.

FORMULATION A

LONG OIL ALKYD ENAMEL

| Ingredient | Generic Name | Manufacturer | Pounds* |
|---|---|---|---|
| Aroplaz 1266 M70 | Long Oil Soya Alky, 70% N.V. | Reichhold Chemicals | 105.76 |
| Mineral Spirits 66/3 | Solvent | Ashland Chemical | 70.60 |
| Mix 5 minutes at 3000 rpm, then add | | | |
| TITANOX 2101 | Titanium Dioxide | Kronos, Inc. | 325.00 |
| Rheological Additive | | | |
| Grind at 5,000 rpm for 15 minutes while maintaining the temperature at 110–120° F., unless otherwise indicated. | | | |
| Cool the paint to 135° F. and mix at 2,000 rpm while adding the following: | | | |
| Aroplaz 1266 M70 | Long Oil Soya Alkyd, 70% N.V. | Reichhold Chemicals | 445.90 |
| 6% Zirconium Nuxtra | Drier | HOls | 10.30 |
| 6% Cobalt Nuxtra | Drier | HOls | 3.42 |
| Exkin #2 | Anti-skinning | HOls | 2.00 |
| Mineral Spirits 66/3 | Solvent | Ashland Chemical | 54.70 |
| Mix for 10 minutes at low speed | | | |
| Total (without rheological additive) | | | 1017.68 |

*Basic formulation; test composition may be prepared with different amounts, but proportional to those set forth.

After the paints were allowed to equilibrate to room temperature overnight, the paint properties such as fineness of grind (indicative of dispersibility), Brookfield viscosity, Stormer viscosity, sag resistance, and gloss were measured.

The fineness of grind (FOG) was measured in Hegman units using a Hegman gauge in accordance with ASTM D1210-79.

Brookfield viscosities at 10 and 100 rpm were measured with a Brookfield Viscometer Model RVT in accordance with ASTM D2196-81. From viscosity data, a Thixotropic Index (TI) was obtained as follows:

$$\text{Thixotropic Index (TI)} = \frac{\text{Viscosity at 10 rpm}}{\text{Viscosity at 100 rpm}}$$

Stormer viscosities were measured in Krebs Units (KU) with a Thomas Stormer Instrument, Model #09730-G15, in accordance with ASTM D562-81.

Sag resistance was measured in mils using a Leneta Sag Multinotch applicator at room temperature in accordance with ASTM D4400-84.

In some instances, gloss measurements were measured at 60° in accordance with ASTM D523-80. Drawdowns were prepared of paints prepared according to Formulation A, and the 60° gloss determined after curing the films for 24 hours at room temperature.

The results of the tests are set forth in Table III below.

COMPARATIVE EXAMPLE C

A long oil aliphatic alkyd gloss enamel paint was prepared according to the procedures described in Formulation A without the addition of a rheological additive. The paint properties were evaluated and are set forth in Table III.

TABLE III

| Exam No. | Fineness of Grind | Brookfield Visc (cP) 10 rpm | Brookfield Visc (cP) 100 rpm | Thixotropic Index | Stormer Visc (KU) | Sag (mils) | 60° (Gloss) |
|---|---|---|---|---|---|---|---|
| 1 | 6B | 4760 | 1590 | 2.99 | 89 | 10.5 | 90 |
| 2 | 7A | 8280 | 2356 | 3.51 | 97 | 17 | 90 |
| Comp A | 3.0A | 1050 | 968 | 1.07 | — | 4 | — |
| 20 | 6.5A | 4160 | 1704 | 2.44 | 93 | 12 | 87 |
| 21 | 6A | 2960 | 1316 | 2.25 | 86 | 9 | — |
| Comp B | 3A | 2880 | 1500 | 1.92 | 90 | 7.5 | 87 |
| 22 | 6A | 3560 | 1384 | 2.57 | 88 | 11 | — |
| 23 | 5B | 3320 | 1412 | 2.49 | 88 | 11 | — |
| 24 | 7A | 3940 | 1832 | 2.15 | — | 10 | 88 |
| 25 | 5.5B | 3960 | 1924 | 2.06 | — | 8 | 88 |
| 26 | 5.5A | 2840 | 1542 | 1.84 | — | 7 | 88 |
| 27 | 6.5B | 4600 | 2088 | 2.20 | — | 12 | 87 |
| 28 | 2C | 2620 | 1482 | 1.77 | — | 6 | 87 |
| 29 | 2C | 4680 | 2100 | 2.23 | — | 12 | 85 |
| 30 | 6.5A | 4000 | 1824 | 2.19 | — | 10 | 87.5 |
| 31 | 6A | 2840 | 1216 | 2.34 | 86 | 7.5 | — |
| 32 | 6.5A | 2280 | 1116 | 2.04 | 85 | 5 | — |
| 33 | 6.5A | 1440 | 948 | 1.52 | 82 | 3 | — |
| 34 | 6.5A | 1440 | 896 | 1.61 | 82 | 3 | — |
| 35 | 6A | 2760 | 1280 | 2.28 | 86 | 6 | — |
| 36 | 6A | 1320 | 924 | 1.43 | 84 | 3 | — |
| 37 | 5.5A | 1000 | 864 | 1.16 | 83 | 4 | 86 |
| 38 | 6.5A | 880 | 760 | 1.16 | 80 | 3 | — |
| Comp C | 7A | 650 | 670 | 0.97 | 78 | 3 | 90 |

A sample of the polyamide ester rheological additive of the present invention was evaluated for fineness of grind (ease of dispersibility), Brookfield viscosities, sag control and gloss using the procedures previously described in an aromatic alkyd gloss paint. The aromatic alkyd gloss paint was prepared by mixing the ingredients set forth in Formulation B in the order listed. The ingredients were mixed using a one horsepower Premier high speed dispersator equipped with a 1⅜ diameter Cowles sawtooth blade. The rheological additive loading was equivalent to three pounds per hundred gallons on a solids basis.

FORMULATION B

AROMATIC ALKYD GLOSS ENAMEL

| Ingredient | Generic Name | Manufacturer | Pounds* |
|---|---|---|---|
| Duramac 2434 | Medium Oil Alkyd Resin | McWhorter, Inc. | 212.0 |
| Xylene | Solvent | Ashland Chemical | 60.0 |
| While stirring, slowly add: | | | |
| Rheological additive | | | |
| Mix for 5 minutes at 3000 rpm. Reduce speed and add: | | | |
| BYK 1045 | Byk-Mallinckrodt | Mallinckrodt, Inc. | 10.0 |
| TITANOX 2101 | Titanium Dioxide | KRONOS, Inc. | 280.0 |
| Grind at 5,000 rpm for 15 minutes while maintaining the temperature at 110–120° F. | | | |
| Reduce speed to 2,000 rpm and add: | | | |
| Letdown: | | | |
| Duramac 2434 | Medium Oil Alkyd Resin | McWhorter, Inc. | 388.0 |
| Xylene | Solvent | Ashland Chemical | 73.5 |
| 6% Cobalt Nuxtra | Drier | HOls | 4.0 |
| Exkin #2 | Anti-skinning Agent | HOls | 1.0 |
| Mix at low speed while cooling to 80° F. | | | |

FORMULATION B-continued

AROMATIC ALKYD GLOSS ENAMEL

| Ingredient | Generic Name | Manufacturer | Pounds* |
|---|---|---|---|
| | | Total (without rheological additive | 1028.5 |

*Basic formulation; test composition may be prepared with different amounts, but proportional to those set forth.

The paint properties were evaluated and are set forth in Table IV which shows the general use in other coating systems of the rheological additives of the present invention.

TABLE IV

| Example No. | Fineness of Grind | Brookfield Visc (cP) 10 rpm | Brookfield Visc (cP) 100 rpm | Thixotropic Index | Sag (mils) | 60° Gloss |
|---|---|---|---|---|---|---|
| 20 | 6.5A | 2240 | 1132 | 1.98 | 11 | 90 |
| Comp B | 6.5A | 2720 | 1184 | 2.30 | 14 | 90 |

A sample of the polyamide ester rheological additive of the present invention was evaluated for fineness of grind (ease of dispersibility), Brookfield viscosities, sag control and gloss using the procedures previously described in a high solids air dry aliphatic alkyd enamel paint. The high solids air-dry aliphatic enamel paint was prepared by mixing the ingredients set forth in Formulation C in the order listed. The ingredients were mixed using a one horsepower Premier high speed dispersator equipped with a 1⅜ diameter Cowles sawtooth blade. The rheological additive loading was equivalent to three pounds per hundred gallons on a solids basis.

FORMULATION C

HIGH SOLIDS AIR-DRY ALIPHATIC ENAMEL

| Ingredient | Generic Name | Manufacturer | Pounds* |
|---|---|---|---|
| Beckosol 92-839 | Alkyd Resin | Reichhold Chemicals | 200.00 |
| Mineral Spirits 66/3 | Solvent | Ashland Chemical | 25.00 |
| Mix well: | | | |
| 6% Calcium Nuxtra | Drier | HOls | 5.84 |
| KRONOS 2101 | Titanium Dioxide | KRONOS, Inc. | 381.50 |
| Rheological Additive | | | |
| Disperse at 5400 rpm for 15 minutes while maintaining the temperature at 125° F. Then add: | | | |
| Letdown: | | | |
| Aromatic 100 | Solvent | Exxon Chemical | 20.10 |
| Beckosol 92-839 | Alkyd Resin | Reichhold Chemicals | 331.91 |
| Mineral Spirits 66/3 | Solvent | Ashland Chemical | 102.60 |
| 12% Cobalt Nuxtra | Drier | HOls | 1.95 |
| 18% Zirconium Nuxtra | Drier | HOls | 9.84 |
| Exkin #2 | Anti-Skinning Agent | HOls | 0.50 |
| | | Total (without rheological additive) | 1079.24 |

*Basic formulation; test composition may be prepared with different amounts, but proportional to those set forth.

The paint properties were evaluated and are set forth in Table V.

TABLE V

| Exam No. | Fineness of Grind | Brookfield Visc (cP) 10 rpm | Brookfield Visc (cP) 100 rpm | Thixotropic Index | Sag (mils) | 60° Gloss |
|---|---|---|---|---|---|---|
| 20 | 7A | 4080 | 1130 | 3.07 | 20 | 86 |
| 21 | 6.5A | 3600 | 1448 | 2.49 | 12 | 85 |
| 39 | 6.5A | 3640 | 1410 | 2.58 | 12 | 85 |
| Comp B | 3.5A | 840 | 582 | 1.44 | 3 | 89 |

A sample of the polyamide ester rheological additive of the present invention was evaluated for fineness of grind (ease of dispersibility), Brookfield viscosities, sag control and gloss using the procedures previously described in a high solids air-dry aromatic gloss enamel paint. The high-solids air-dry aromatic paint was prepared by mixing the ingredients set forth in Formulation D in the order listed. The ingredients were mixed using a one horsepower Premier high speed dispersator equipped with a 1⅜ diameter Cowles sawtooth blade. The rheological additive loading was equivalent to three pounds per hundred gallons on a solids basis.

FORMULATION D

HIGH SOLIDS AIR-DRY AROMATIC ENAMEL

| Ingredient | Generic Name | Manufacturer | Pounds* |
|---|---|---|---|
| Aroplaz 6440-A4-85 | Alkyd Resin | Reichhold Chemicals | 200.00 |
| Xylene | Solvent | Ashland Chemical | 30.00 |
| Nuospere 700 | Dispersant | HOls | 5.00 |
| KRONOS 2101 | Titanium Dioxide | KRONOS, Inc. | 350.00 |
| Rheological Additive | | | |
| Disperse at 5400 rpm for 15 minutes while maintaining the temperature at 125° F. Then add: | | | |
| Letdown: | | | |
| Aroplaz 6440-A4-85 | Alkyd Resin | Reichhold Chemicals | 300.00 |
| Xylene | Solvent | Ashland Chemical | 190.00 |
| 6% Zirconium Nuxtra | Drier | HOls | 8.00 |
| 6% Calcium Nuxtra | Drier | HOls | 8.00 |
| 6% Cobalt Nuxtra | Drier | HOls | 4.00 |
| Exkin #2 | Anti-Skinning Agent | HOls | 1.00 |
| | | Total (without rheological additive) | 1096.00 |

*Basic formulation; test composition may be prepared with different amounts, but proportional to those set forth.

The paint properties were evaluated and are set forth in Table VI.

TABLE VI

| Exam No. | Fineness of Grind | Brookfield Visc (cP) 10 rpm | Brookfield Visc (cP) 100 rpm | Thixotropic Index | Sag (mils) | 60° Gloss |
|---|---|---|---|---|---|---|
| 20 | 7A | 2960 | 1100 | 2.69 | 12 | 89 |
| 21 | 6.5A | 1900 | 770 | 2.47 | 8 | — |
| Comp B | 7A | 2320 | 1012 | 2.29 | 8 | 89 |
| 39 | 6.5A | 2700 | 876 | 3.08 | 12 | — |

EFFECT OF INCORPORATION TEMPERATURE ON EFFECTIVENESS OF RHEOLOGICAL ADDITIVE

To evaluate the effect of incorporation temperature on ease of dispersibility (as measured by fineness of grind) and thickening capabilities and paint sag control, the rheological additive of Example 21 was incorporated into Formulation A where the grind step was maintained at temperatures varying from 120° to 160° F. The rheological additive loading was equivalent to three pounds per hundred gallons on a solids basis. The paint properties were evaluated and are set forth in Table VII.

TABLE VII

| Exam No. | Incor. Temp. (°F.) | FOG | Brookfield Visc (cP) | | T.I. | Stormer Visc (KU) | Sag (mils) | 60° Gloss |
|---|---|---|---|---|---|---|---|---|
| | | | 10 rpm | 100 rpm | | | | |
| 21 | 120 | 6.5A | 4640 | 1940 | 2.39 | 97 | 14 | 87 |
| | 130 | 6.5A | 5200 | 2112 | 2.46 | 98 | 14 | 87 |
| | 140 | 6.5A | 5440 | 2240 | 2.43 | 100 | 16 | 87 |
| | 150 | 6.5A | 6800 | 2568 | 2.64 | 102 | 18 | 85 |
| | 160 | 6.5A | 7360 | 2704 | 2.72 | 102 | 20 | 85 |

The invention being thus described, it will be obvious that the same may be varied in many ways. However, such variations are not to be regarded as a departure from the spirit and scope of the invention and all such modifications are intended to be included within the scope of the following claims.

What is claimed:

1. A rheological additive comprising the reaction product of:
   a) polycarboxylic acid having at least 5 carbon atoms per acid group
   b) a first active hydrogen compound having the formula $X_m$—R—$Y_n$, wherein R represents a group containing from 2 to 12 carbon atoms, X and Y are groups independently selected from primary amino, secondary amino and hydroxyl, m and n are at least 1 and the sum of (m+n) is at least 2 and at least 90% of the X and Y groups participating in the reaction being primary amino, secondary amino and a mixture thereof;
   c) a second active hydrogen compound containing two active hydrogen functionalities wherein the hydrogen compound is represented by one of the following formulas:

$$H-(OCH_2CH_2)_n-OH$$

wherein
   n=8—50 or

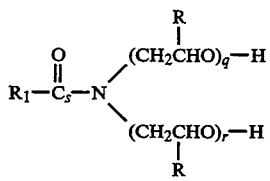 (I)

wherein
   q+r=2—50, $R_1$ is a long chain alkyl group $C_{12}$–$C_{22}$, s is zero or one, and R is one of hydrogen, methyl and ethyl; and
   (d) capping agent.

2. The rheological additive according to claim 1, wherein the second active hydrogen compound is a polyether moiety with at least two active hydrogen groups.

3. The rheological additive according to claim 1, wherein the second hydrogen compound has at least one of an active amine or hydroxyl moiety at each termini of a polyether chain.

4. The rheological additive according to claim 1, wherein the polycarboxylic acid is selected from the group consisting of oligomers of fatty acids substantially comprised of dimerized fatty acid, sebacic acid, poly (butadiene) dioic acids, dodecane dicarboxylic acid and mixtures thereof.

5. The rheological additive according to claim 1, wherein at least 50% of the x+y groups in the first active hydrogen compound participating in the reaction are one of primary amino, secondary amino and a mixture thereof.

6. The rheological additive according to claim 1, wherein the first active hydrogen compound having the formula $X_m$—R—$Y_n$ is selected from the group consisting of polyamines including 1,2-diaminoethane, 1,2- and 1,3-diaminopropane, 1,4-diaminobutane, 1,6-diaminohexane, 1,8-diaminooctance, 1,12-diaminododecane, 3,3-diaminopropyl-N-methyl-amino, N-alkyl-1,3-diaminopropanes where the alkyl group is a long carbon chain such as coco or tallow alkyl, soya alkyl, hydrogenated tallow alkyl, oleyl, stearyl and mixtures thereof, and amino alcohols, including ethanolamine, 6-aminohexanol, aminoethylethanolamine and mixtures thereof.

7. The rheological additive according to claim 1, wherein the reaction product is a reaction product of oligomer of fatty acid having a carbon chain of from 15 to 18 carbon atoms, diamine having from 6 to 12 carbon atoms, an ethoxylated $C_{12}$–$C_{18}$ alkyl amine having 2 to 10 ethoxylated units, and monocarboxylic acid having from 8 to 22 carbon atoms as the capping agent.

8. The rheological additive according to claim 1, wherein, to form the reaction product, the amount of the first active hydrogen compound reacted is from about 0.75 to about 1.175 moles per mole of the reacted polycarboxylic acid, the amount of the second active hydrogen compound is from about 0.25 to about 0.50 mole per mole of the reacted polycarboxylic acid, and the amount of the capping agent is from about 0.3 to about 2.0 moles per mole of the reacted polycarboxylic acid.

9. A pre-dispersed mixture of a rheological additive in an organic solvent, said rheological additive comprising the reaction product of:
   a) polycarboxylic acid having at least 5 carbon atoms per acid group;
   b) a first active hydrogen compound having the formula $X_m$—R—$Y_n$, wherein R represents a group containing from 2 to 12 carbon atoms, X and Y are groups independently selected from primary amino, secondary amino and hydroxyl, m and n are at least 1 and the sum of (m+n) is at least 2 and at least 90% of the X and Y groups participating in the reaction being primary amino, secondary amino and a mixture thereof;
   c) a second active hydrogen compound containing two active hydrogen functionalities wherein the hydrogen compound is represented by one of the following formulas:

$$H-(OCH_2CH_2)_n-OH$$

wherein
n=8—50 or;

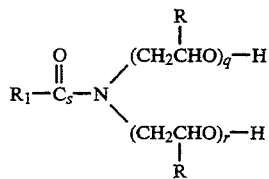

(I)

wherein
- q+r=2—50, $R_1$ is a long chain alkyl group $C_{12}$-$C_{22}$, is zero or one, and R is one of hydrogen, methyl and ethyl, and
- d) capping agent.

10. The pre-dispersed mixture according to claim 9, wherein the reaction product is a reaction product of oligomer of fatty acid having a carbon chain of from 16 to 18 carbon atoms, diamine having from 6 to 12 carbon atoms, an ethoxylated $C_{12}$-$C_{18}$ alkyl amine having 2 to 10 ethoxylated units, and monocarboxylic acid having from 8 to 22 carbon atoms as the capping agent.

11. A thickened organic composition containing the rheological additive in an amount sufficient to prevent formation of large agglomerates as may develop during storage, said rheological additive comprising the reaction product of:
   a) polycarboxylic acid having at least 5 carbon atoms per acid group
   b) a first active hydrogen compound having the formula $X_m$—R—$Y_a$, wherein R represents a group containing from 2 to 12 carbon atoms, X and Y are groups independently selected from primary amino, secondary amino and hydroxyl, m and n are at least 1 and the sum of (m+n) is at least 2;
   c) a second active hydrogen compound containing two active hydrogen functionalities wherein the hydrogen compound is represented by one of the following formulas:

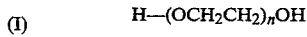

wherein
n=8—50 or

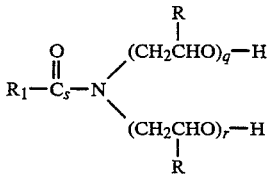

(I)

wherein
- q+r=2—50, $R_2$ is a long chain alkyl group $C_{12}$-$C_{22}$, s is zero or one, and R is one of hydrogen, methyl and ethyl, and
- (d) capping agent.

12. The thickened organic composition according to claim 1, wherein the reaction product is a reaction product of oligomer of fatty acid having a carbon chain of from 16 to 18 carbon atoms, diamine having from 6 to 12 carbon atoms, and ethoxylated $C_{12}$-$C_{18}$ alkyl amine having 2 to 10 ethoxylated units, and monocarboxylic acid having from 8 to 22 carbon atoms as the capping agent.

13. The rheological additive according to claim 1, wherein the active hydrogen compound has no more than 12 carbon atoms and the alkoxylated active hydrogen compound has greater than 12 carbon atoms.

14. The rheological additive according to claim 1, wherein less than 90% of the X and Y groups participating in the reaction being primary amino, secondary amino and a mixture thereof.

* * * * *